Jan. 17, 1939.                W. KLOCKE                2,144,223
                              FRICTION PLATE
                           Filed May 17, 1938          2 Sheets-Sheet 1
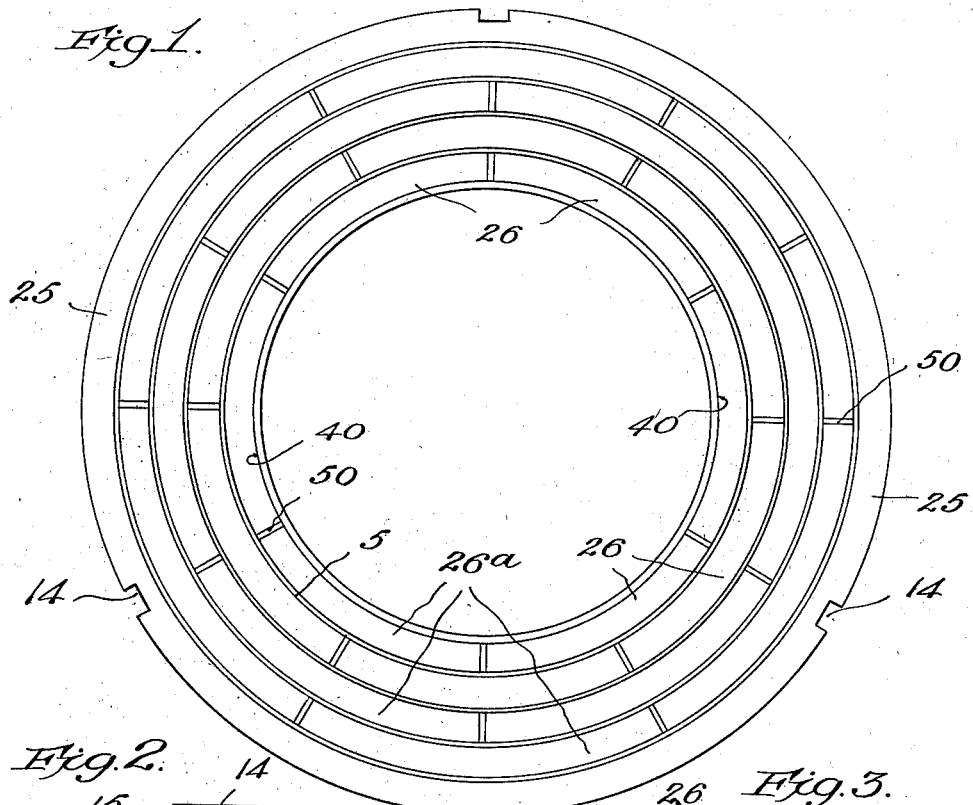
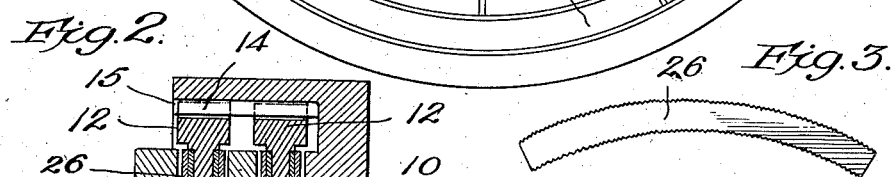
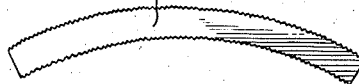
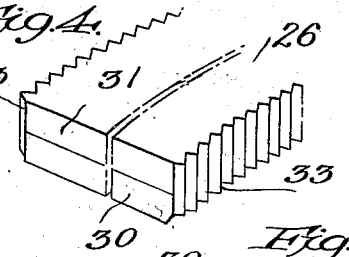
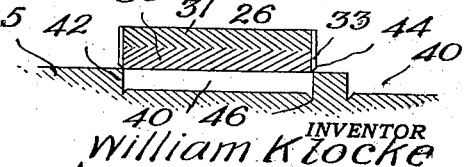
INVENTOR
William Klocke
BY
G. W. Thompson
ATTORNEY Jan. 17, 1939. W. KLOCKE 2,144,223
FRICTION PLATE
Filed May 17, 1938 2 Sheets-Sheet 2
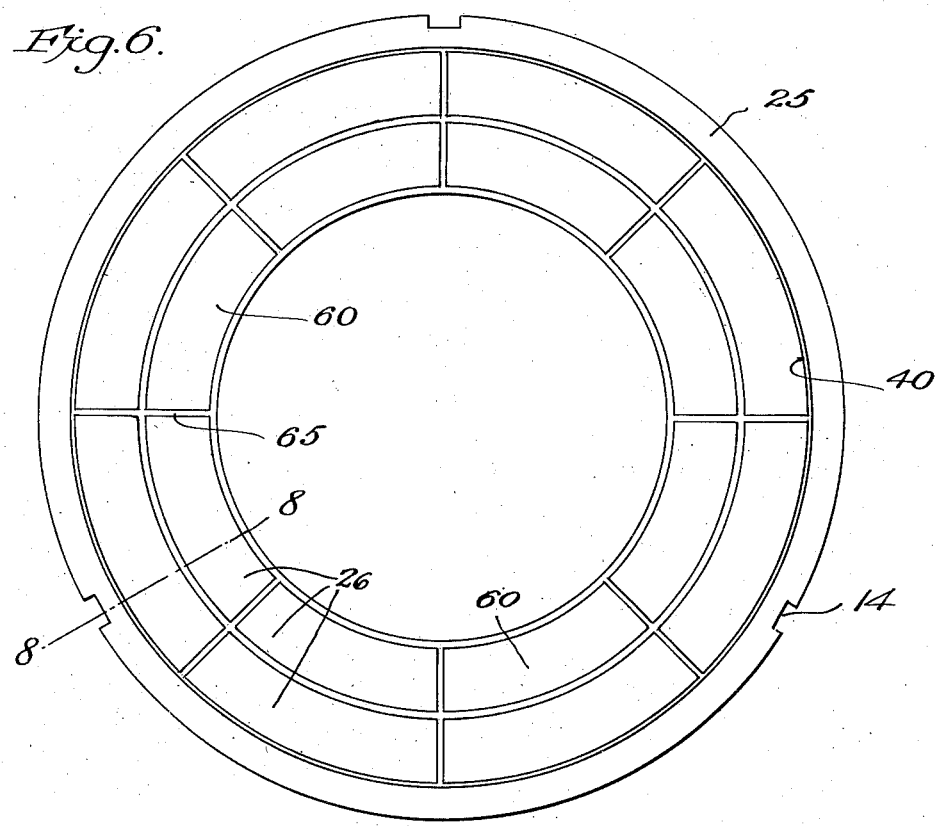
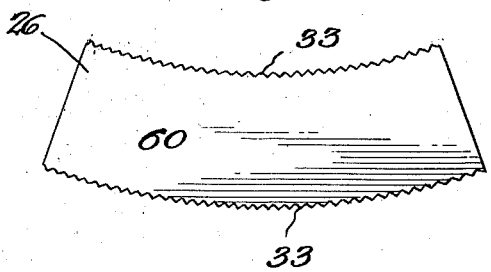
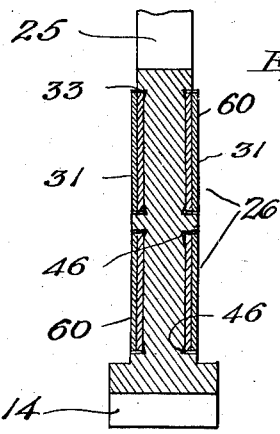
INVENTOR
William Klocke
BY
ATTORNEY Patented Jan. 17, 1939

2,144,223

UNITED STATES PATENT OFFICE 2,144,223

FRICTION PLATE

William Klocke, Woodhaven, N. Y.

Application May 17, 1938, Serial No. 208,352

6 Claims. (Cl. 192—107)

This invention relates to friction plates for clutches, brakes and the like, and provides improvements therein.

Friction plates are ordinarily made of metal, such as steel, having attached thereto another material, having a higher coefficient of friction, which makes superficial contact with a complementary engaging part.

Not so long ago blocks of wood, usually seated in recesses on the plates, were principally used as the friction material. With the increase in speeds and loads the wood rapidly disintegrated, charred and ignited. These objections to wood were largely overcome by the use of facings or linings of woven asbestos and later by compositions of asbestos and thermo-plastic resins. These latter linings are now almost universally used, especially where clutches and brakes are subject to heavy duty, as in large presses, automobiles, etc.

With the large increase in the speeds of machinery, and in the loads to be set in motion and stopped, the deterioration of the linings of clutches, and brakes, and the strains tending to detach the linings, have become so great as to greatly shorten the useful life of such linings and to occasion much expense for renewals and for machine-time lost.

Moreover, as encountered in actual practice, rivets are universally used for fastening linings to the plates which carry them. The use of rivets has many disadvantages. The rivets must carry nearly the entire load. A considerable number of them must be used. They must be carefully set so that each one sustains its part of the load, and also to avoid buckling when the parts become heated in use. The sudden and severe strains also cause the rivets to become loose. Moreover to replace a worn or loosened lining, the clutch must be taken down, which is both expensive and time consuming. Because of these and other disadvantages the need for more durable and satisfactory friction plates has now been felt for some years.

The present invention provides a friction plate for clutches, brakes and the like which avoids the objections heretofore referred to, greatly increasing the durability thereof, avoiding the necessity of using rivets, and greatly facilitating the replacement of worn or defective linings, enabling the replacement to be made without removing the clutch parts from the shafts. According to the present invention the linings are attached to the plates by means of teeth or the like which act by resistance to shear to sustain the loads put on the linings.

The lining on a clutch friction-plate having an outside diameter of 18 inches and an inside diameter of 16⅝ inches should sustain a drag or load tending to separate the lining from the plate which carries it, of 250 tons or more. The same clutch-disk, utilizing more of its diameter, should therefore readily sustain a drag or load of 500 tons or more.

Other advantages, obvious to those familiar with the clutch and brake art, lead from those herein set out.

Two embodiments of the invention are illustrated in the accompanying drawings, wherein:

Fig. 1 is a side elevation of a friction plate according to one embodiment of the invention.

Fig. 2 is a longitudinally sectional view through a clutch, showing the relationship of the friction plate to the other members of the clutch.

Fig. 3 is a face view of one of the liners shown in Fig. 1.

Fig. 4 is a detailed view, considerably enlarged, looking at one end of the liner in perspective. The broken lines indicate that the median portion of the liner has been omitted in the illustration.

Fig. 5 is a transverse sectional view, on an enlarged scale, illustrating the mode of attaching the liner to the body plate.

Fig. 6 is a face view of another embodiment of the friction disk, according to the present invention.

Fig. 7 is a face view, somewhat enlarged of one of the liners shown in Fig. 6.

Fig. 8 is a transverse sectional view on the line 8—8, Fig. 6.

Referring to said drawings, a clutch provided with friction plates according to the present invention is shown in Fig. 2. In the form here shown, there is a plate carrier 10, mounted loosely on a shaft 11, and entraining friction disk 12 therewith. For this purpose the friction disks may be provided with notches 14 into which project ribs 15 on the carrier 10. The carrier 10 and the plates 12 entrained therewith are here, the driving element or part of the clutch. The driven element as here shown, is the hub 18 having plates 20, 21 interleaved with the friction disks 12, and rotatively fastened to the hub 18 as by means of ribs and slots 23, 24 similar to 12 and 15.

When the interleaved plates 12, 20, 21 are pressed together, the frictional engagement of the plates 12 with the plates 20, 21 "engages" the clutch, so that the shaft 11 and hub 18 thereon are driven by the driving part 10. Brakes with interleaved friction plates are constructed and operate quite similar to clutches, the function of the clutches being to drive, and that of brakes to stop. Instead of the interleaved construction, clutches and brakes oftentimes comprise a single engaging part on each of the driving and driven parts of the clutch or brake.

A friction plate according to the present invention comprises a strong body plate 25 (steel advantageously) and a liner or facing 26. The liner or facing 26 may be provided on one or both faces of the body-plate 25.

The liner 26 comprises a metal backing plate 30 advantageously of steel having thereon an integral facing or layer of metallic friction material 31. The metallic friction material may have any suitable composition. I advantageously use a friction material composed mainly of copper and lead, united to a sheet of steel by a welding or diffusion process. The friction material is of a brittle nature, and to give it strength, it is applied as a relatively thin coating on and integral with a backing sheet of steel.

Through the intermediary of the backing plate 30 a steel to steel engagement of the liner with the body plate 25 may be obtained, and the connection made independently of the friction material on the backing plate. To this end, means are provided for uniting the liner 26 to the body plate 25 at the edges of the backing plate 30. In one form of said means the backing plate 30 is provided with a plurality of teeth at its edge or edges, shown in Figs. 3 and 4, and these teeth are embedded in the plate 25. To obtain a very tenacious union between the liner 26 and the body plate 25, a matrix is formed by pressing the backing plate 30 with the teeth 33 thereon into the metal of the body plate 25 under the action of great force, the teeth 33 thereby displacing metal from the body plate, and embedding themselves therein, and being thereby very firmly united to the body-plate.

The body plate 25 is advantageously formed with one or more annular grooves 40, which grooves preferably have a depth about equal to the thickness of the backing sheet 30, so that the liner, when pressed into the groove, carries the metallic friction material 31 projecting beyond the face of the body plate 25. The groove or grooves 40 are advantageously formed slightly narrower than the width of the backing plate 30 with the teeth 33 thereon, the teeth 33 thereby displacing metal from the adjacent portion 42 of the body plate 25 when the backing plate 30 with the teeth 33 thereon is forced into the groove 40. Moreover the backing plate 30 at its corners adjacent its inner face is preferably chamfered, as indicated at 44, to facilitate the entrance of the toothed backing plate 30 into the groove 40. Moreover, the groove 40, adjacent the side walls of the groove, may be slightly deepened as indicated at 46, to receive any metal which may be pushed ahead by the teeth 33, and thereby assure a firm seat of the backing plate 30 against the bottom of the groove 40.

The position of the teeth 33, and of the matrices formed thereby may be reversed. That is, either the body plate 25 or the backing plate 30 may be provided with teeth, and the matrices formed in the other part.

In the form of embodiment shown in Fig. 1, the liner 26 may comprise one or more annular pieces or strips 26ª. The annular strip 26 may be divided and spaced somewhat in a groove 40 on the body plate 25, as indicated at 50. The spaces 50, as well as spaces 51, between annular grooves, provide spaces into which dirt or detached particles may escape. In Fig. 1, 4 annular lining rings are shown, and each ring, as shown, is made up of 6 or more strips. As many annular rings and as many divisions of the liner strip in a ring as desired, may be provided.

The liner 26, as heretofore stated, is secured to the body plate 25 with great firmness. The outer liner ring alone Fig. 1, providing it has an outside diameter of 18 inches and an inside diameter of 16⅝ inches, would have a resistance to shear between the teeth thereon and the metal of the body plate, (steel to steel) in excess of 250 tons, and therefore the friction plates are well adapted to sustain great forces in braking or in driving without detachment of the liners from the body plate.

In the embodiment shown in Figs. 6 and 7, the body plate 25 is provided with two annular grooves 40 having a width corresponding substantially to that of the width of the several grooves shown in Fig. 1. The liner 26 may have an annular form divided into a plurality of strips 60, having a width slightly greater than the width of its groove. The backing plate 30 of the liner has teeth 33 at its opposite edges, or at one edge which teeth 33, when the liner is pressed into the body plate 25 are embedded in the metal of the body plate, as hereinbefore described. The annular strips 60 may be spaced apart slightly in the groove 40 as indicated at 65 so as to thereby provide a space for the escape of dirt, etc., as previously described.

Tests have shown the great strength of the connection between the body plate 25 and the liner 26, that excellent performance is obtained in clutch action, that the wear is very small.

Experiments have also shown the advantage of limiting the width of the strips 26, 60. Expansion of the steel backing-plate 30 so as to avoid appreciable bowing of the lining due to heating in use will be avoided by making them relatively narrow. The strips 26, Fig. 1 are ¾ inch wide. The strips 60, Fig. 6 are about 1¼ inches wide. These widths have been found to be such as to avoid appreciable bowing when in use.

The invention may receive other embodiments than those herein specifically illustrated and described.

What is claimed is:

1. A friction plate for clutches, brakes, and the like, comprising a metal body plate through which frictional force developed upon engagement with a complementary clutch or brake part is transmitted or sustained, a liner, and means for fastening the liner to said body-plate, and, as a novel characteristic or characteristics, said liner comprising a metal backing plate and a facing of metallic friction material integrally bonded to said backing plate, said body plate having a groove in which said liner is inserted, and means interacting between a side wall of the groove and an edge of said backing plate for uniting said metal body plate and said liner at edges of said backing plate.

2. A friction plate according to claim 1, wherein said uniting means comprises teeth on one part embedded in the other part.

3. A friction plate according to claim 1, wherein said uniting means comprises teeth and matrices for the teeth, located at an edge of said backing plate and a portion of the backing plate adjacent said groove.

4. A friction plate according to claim 1, wherein said uniting means comprises teeth and matrices for the teeth on an edge of said backing plate and a portion of the backing plate adjacent said groove, and wherein a corner of said backing plate at the rear face thereof is chamfered.

5. A friction plate for clutches, brakes and the like, comprising a metal body plate through which frictional force developed upon engagement with a complementary clutch or brake part is transmitted or sustained, a liner and means for fastening the liner to said body plate, and, as a novel characteristic or characteristics, said body plate having an annular groove in the face, said liner comprising a metal backing plate and a facing of metallic friction material integrally bonded to said backing plate, said backing plate having a toothed edge, said groove being of less width than said toothed backing plate, and said backing plate being joined to said body plate through the engagement of said teeth, the matrices of said teeth resulting from forced introduction of said backing strips into said groove and displacement of metal by said teeth.

6. A friction disk according to claim 5, wherein said liner has the form of a plurality of annular arcuate strips.

WILLIAM KLOCKE.